(12) United States Patent
Isaacson (10) Patent No.: US 8,380,972 B2
(45) Date of Patent: *Feb. 19, 2013

(54) PARALLELIZING MULTIPLE BOOT IMAGES WITH VIRTUAL MACHINES

(75) Inventor: Scott A. Isaacson, Kamuela, HI (US)

(73) Assignee: Apple Inc., Cupertino, CA (US)

( * ) Notice: Subject to any disclaimer, the term of this patent is extended or adjusted under 35 U.S.C. 154(b) by 689 days.

This patent is subject to a terminal disclaimer.

(21) Appl. No.: 12/416,389

(22) Filed: Apr. 1, 2009

(65) Prior Publication Data

US 2009/0193245 A1    Jul. 30, 2009

Related U.S. Application Data (63) Continuation of application No. 11/370,515, filed on Mar. 7, 2006, now Pat. No. 7,536,541.

(51) Int. Cl.
*G06F 9/24* (2006.01)
*G06F 15/177* (2006.01)

(52) U.S. Cl. ........... 713/2; 713/1; 713/100; 718/106; 718/107; 718/108

(58) Field of Classification Search .......... 713/1, 2, 713/100; 718/106, 107, 108
See application file for complete search history.

(56) References Cited

U.S. PATENT DOCUMENTS

| | | | | |
|---|---|---|---|---|
| 7,536,541 | B2 * | 5/2009 | Isaacson ................... | 713/2 |
| 2004/0064813 | A1 * | 4/2004 | Neiger et al. .............. | 718/1 |
| 2006/0089992 | A1 * | 4/2006 | Blaho ....................... | 709/227 |
| 2006/0248527 | A1 | 11/2006 | Jaeckel et al. | |
| 2007/0168478 | A1 | 7/2007 | Crosbie | |

OTHER PUBLICATIONS

"Firefox Help: How to Manage Profiles"; http://www.mozilla.org/support/firefox/profile; printed on Aug. 27, 2007; pp. 1-4.
"XenFaq—Xen Wiki"; http://www.wiki.xensource.com/xenwiki/XenFaq; printed on Aug. 27, 2007; pp. 1-7.
Buytaert, Kris; "Linux Virtualization with Xen"; LinuxDevCenter.com; http://www.linuxdevcenter.com/pub/a/linux/2006/01126/xen.html; Jan. 26, 2006; pp. 1-3.
Rosen, Rami; "Introduction to the Xen Virtual Machine"; LinuxJournal.com; http://www.linuxjournal.com/article/8540; Sep. 1, 2005; pp. 1-10.
Clark, Bryan; "A Moment of Xen: Virtualize Linux to Test Your Apps"; IBM.com; http://www-128.ibm.com/developerworks/linux/library/I-xen/; Mar. 15, 2005; pp. 1-6.

* cited by examiner

*Primary Examiner* — Kim Huynh
*Assistant Examiner* — Michael J Brown
(74) *Attorney, Agent, or Firm* — Fish & Richardson P.C.

(57) ABSTRACT

A system and method are presented for converting a multi-boot computer to a virtual machine. Existing boot images on a multi-boot computer are identified and converted into virtual machine instances. Each virtual machine instance represents an operating system and is capable of running at the same time. Finally, a new hosting operating system is installed. The new hosting operating system launches and manages the converted virtual machine instances.

28 Claims, 11 Drawing Sheets

PARALLELIZING MULTIPLE BOOT IMAGES WITH VIRTUAL MACHINES

CROSS REFERENCE TO RELATED APPLICATIONS

This application is a continuation of U.S. patent application Ser. No. 11/370,515, filed on Mar. 7, 2006, now U.S. Pat. No. 7,536,541, issued May 19, 2009, the disclosure of which is herein incorporated by reference.

FIELD OF THE INVENTION

This invention pertains to a virtual machine on a computer, and more particularly converting boot images on a multi-boot computer to virtual machine instances capable of running in parallel.

BACKGROUND OF THE INVENTION

Multi-boot computers allow a single computer to run more than one operating system (OS). When a multi-boot computer is started, a boot menu prompts the user of the computer to select which of the available operating systems the user would like to run on the computer. Then a boot manager loads the selected OS, and the selected OS is run on the computer, until the computer is rebooted or the OS is otherwise ended.

Multi-boot computers are useful for users who would like to have more than one OS on their computer. For example, a user might wish to have both an open source OS, such as Linux®, installed on his system, as well as a closed source or proprietary OS, like Microsoft® Windows®. (Linux is a registered trademark to Linus Torvalds. Microsoft and Windows are registered trademarks to Microsoft Corporation in the United States and/or other countries.) Another user might be interested in supporting multiple versions of the same OS.

Multi-boot computers use a boot loader to launch a selected OS on startup. There are both open source and proprietary boot loaders. Examples of current open source boot loaders include Linux GRUB (GRand Unified Bootloader) and LILO (The LInux LOader). Microsoft offers the Microsoft Windows Boot Loader, a proprietary boot loader.

Although multi-boot computers allow more than one OS to be run on a computer, only one OS can be run on the computer at a time. This means that a user logged into one OS wishing to switch to another OS must exit the first OS and reboot the computer in order to use the second OS. As the computer is started up, the selected OS initializes the computer according the configuration of the OS. Then, in shutting down the computer, the resources are freed and the user is able to select and use a different OS when starting up the computer again.

Another disadvantage with multi-boot computers is that adding additional boot images requires oversight to ensure that one OS installation does not interfere with another OS installation. For example, each OS must have adequate hard disk space in order to fully operate on the computer. Each OS is configured to use resources on the partition of the computer associated with the OS. While some potential conflicts might be readily recognized by the user adding an OS, other conflicts might be less apparent.

Development of virtual machines (VMs) has enabled more than one OS to be run on a computer at the same time: in other words, the multiple operating systems can be run in parallel. A VM consists of a hosting OS and VM instances representing operating systems to run on the computer. The hosting OS loads the appropriate VM instances. Each VM instance is essentially an emulation of the OS it represents, appearing to the user as if the OS were running directly on the computer.

A VM has as an advantage over a multi-boot computer in that it might be possible to run multiple VM instances at the same time. Instead of having to reboot the computer to switch between operating systems, a user need only access an interface in a VM manager. By running VMs, a user can run applications designed for multiple operating systems at the same time. But the advantage of being able to run more than one VM instance in parallel is offset by a performance hit in running the hosting OS and running the target operating systems as virtual machines.

As a VM instance is installed on a computer, the VM instance is configured to access installed hardware, to use partitions of a hard drive, and to use optional features of the VM instance. Care needs to be taken to ensure that the configuration of a new VM instance does not interfere with a previously installed VM instance. Just as additional boot images on a multi-boot computer can introduce possible conflicts, adding VM instances can also introduce conflicts.

A user interested in switching from a multi-boot computer to a VM, must manually configure each VM instance in order for the VM instances to operate similarly to the existing boot images. In doing this, conflicts that did not exist as boot images might be introduced in installing the virtual machine instances. For example, if two boot images are configured to use static internet protocol (IP) addresses, there is no conflict because only one boot image is running at any given time. However, if two VM instances are set up with static IP addresses, and the two VM instances are running at the same time, then it is unclear which of the two VM instances should receive data being routed to the computer.

Accordingly, a need remains for a way to convert a multi-boot computer system into a virtual machine, converting previous configurations of the boot images to configurations for VM instances, and detecting and resolving conflicts between the converted VM instances, to address these and other problems associated with the prior art.

SUMMARY OF THE INVENTION

Embodiments of the invention include systems and methods to convert a multi-boot computer to a virtual machine. Existing boot images are identified and converted into virtual machine instances to be managed by a new hosting operating system. The conversion of boot images to virtual machine instances includes configuring the virtual machines according to the boot image configurations and resolving conflicts in the converted virtual machine instances. Finally, a new hosting operating system capable of running multiple operating systems as virtual machines is installed.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
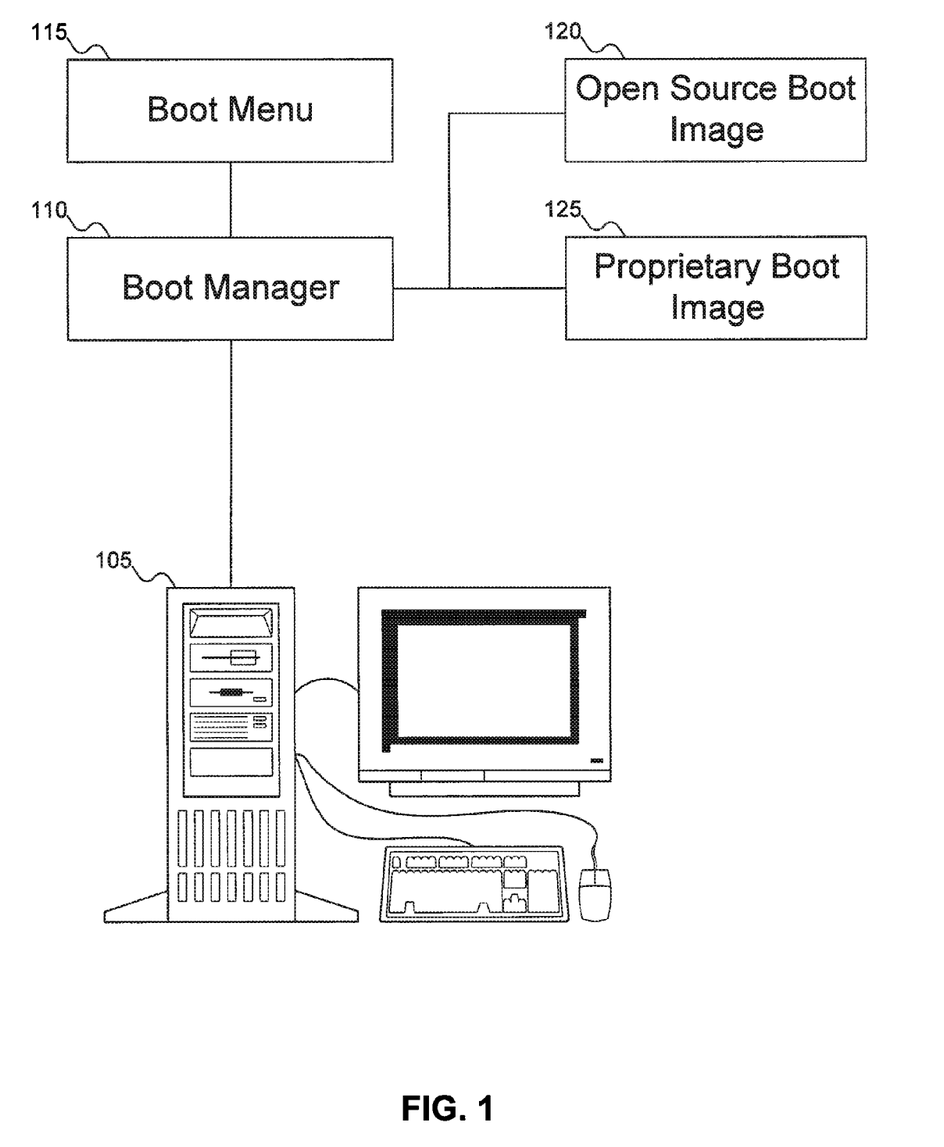
FIG. 1 shows a prior art multi-boot computer capable of booting more than one operating system, one operating system at a time.

FIG. 1 shows a multi-boot computer capable of booting more than one operating system, running only one operating system at a time. While computer 105 is described as "multi-boot", suggesting any number of operating systems, the term "multi-boot" is intended to include "dual-boot", where the computer loads one of two operating systems, or even a single boot computer, where only one operating system (OS) is loaded. Computer 105 includes boot manager 110 with boot menu 115. Upon startup of computer 105, boot manager 110 displays boot menu 115. Boot menu 115 allows a user of computer 105 to select which OS available on computer 105 should be booted up and run on computer 105. For example, computer 105 is shown as including open source boot image 120 and proprietary boot image 125. While only two OS boot images are shown in FIG. 1, a person skilled in the art will recognize that there can be any number of OS boot images installed and available for selection. For example, in addition to having an open source boot image and a proprietary boot image, there can be other OS boot images. It is possible for computer 105 to have any number of versions of either proprietary or open source operating systems available for selection from boot menu 115 and managed by boot manager 110. For example, computer 105 can have three proprietary operating systems installed, and no open source operating systems.

Figure 2:
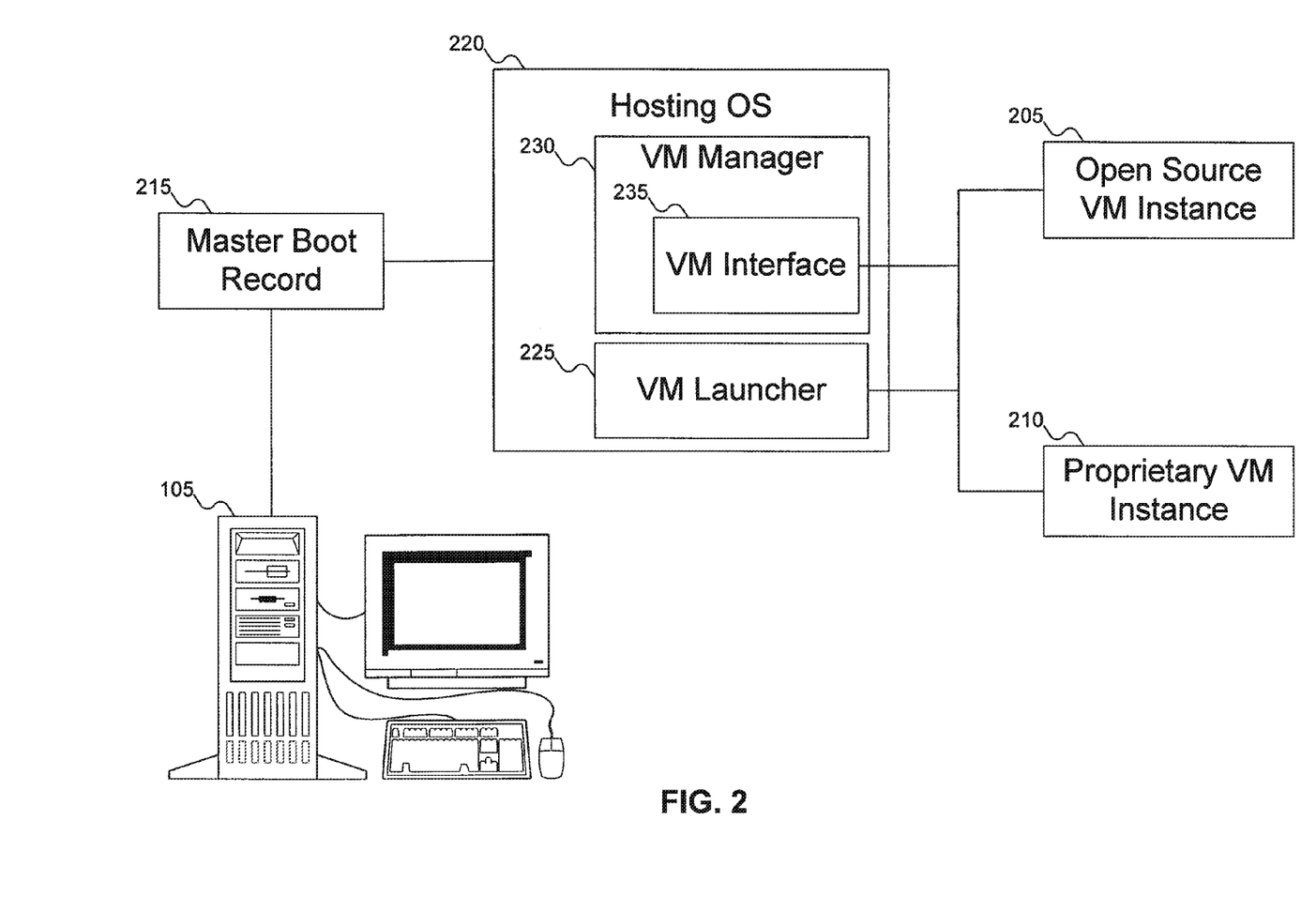
FIG. 2 shows the computer of FIG. 1 converted to a virtual machine capable of running more than one operating system in parallel, according to an embodiment of the invention.

FIG. 2 shows the computer of FIG. 1 converted to a virtual machine (VM) capable of running more than one operating system in parallel, according to an embodiment of the invention. The boot images of FIG. 1 are converted to open source VM instance 205 and proprietary VM instance 210. Details on how the VM instances are converted are discussed below with reference to FIG. 3.

After the boot images on computer 105 are converted to virtual machine instances, master boot record 215 is installed on computer 105. The new master boot record 215 is configured to load hosting OS 220 on startup of computer 105. Hosting OS 220 includes VM launcher 225 and VM manager 230, which in turn includes VM interface 235.

VM manager 230 manages the running of VM instances, and includes VM interface 235 that enables users to switch between the VM instances. For example, if open source VM instance 205 and proprietary VM instance 210 are both running, the user might see only the user interface of one of the VM instances while the other VM instance runs in the background. VM interface 235 allows the user to switch between which VM instance is visible and accessible for user inputs. VM interface 235 can also enable display of multiple VM instance at the same time, if desired.

VM interface 235 also enables a user to start and stop a VM instance as needed. For example, a user might first start up computer 105 to use an application on an open source operating system. The user can use VM interface 235 to select and start open source VM instance 205. While using open source VM instance 205 on computer 105, the user might then want to use an application on a proprietary OS. Even though VM instance 205 is already running, the user can again use VM interface 235 to start running proprietary VM instance 210, without shutting down open source VM instance 205. While both VM instances are running in parallel, VM interface 235 can be used to switch between VM instances or stop one of the VM instances from running.

VM launcher 225 starts VM instances, such as open source VM instance 205 or proprietary VM instance 210. As previously discussed, the user can start and run one VM instance at a time, or run more than one in parallel. Hosting OS 220 effectively creates emulations of the boot images using the VM instances. So, open source VM instance 205 emulates open source boot image 120, and proprietary VM instance 210 emulates proprietary boot image 125 of FIG. 1.

Figure 3:
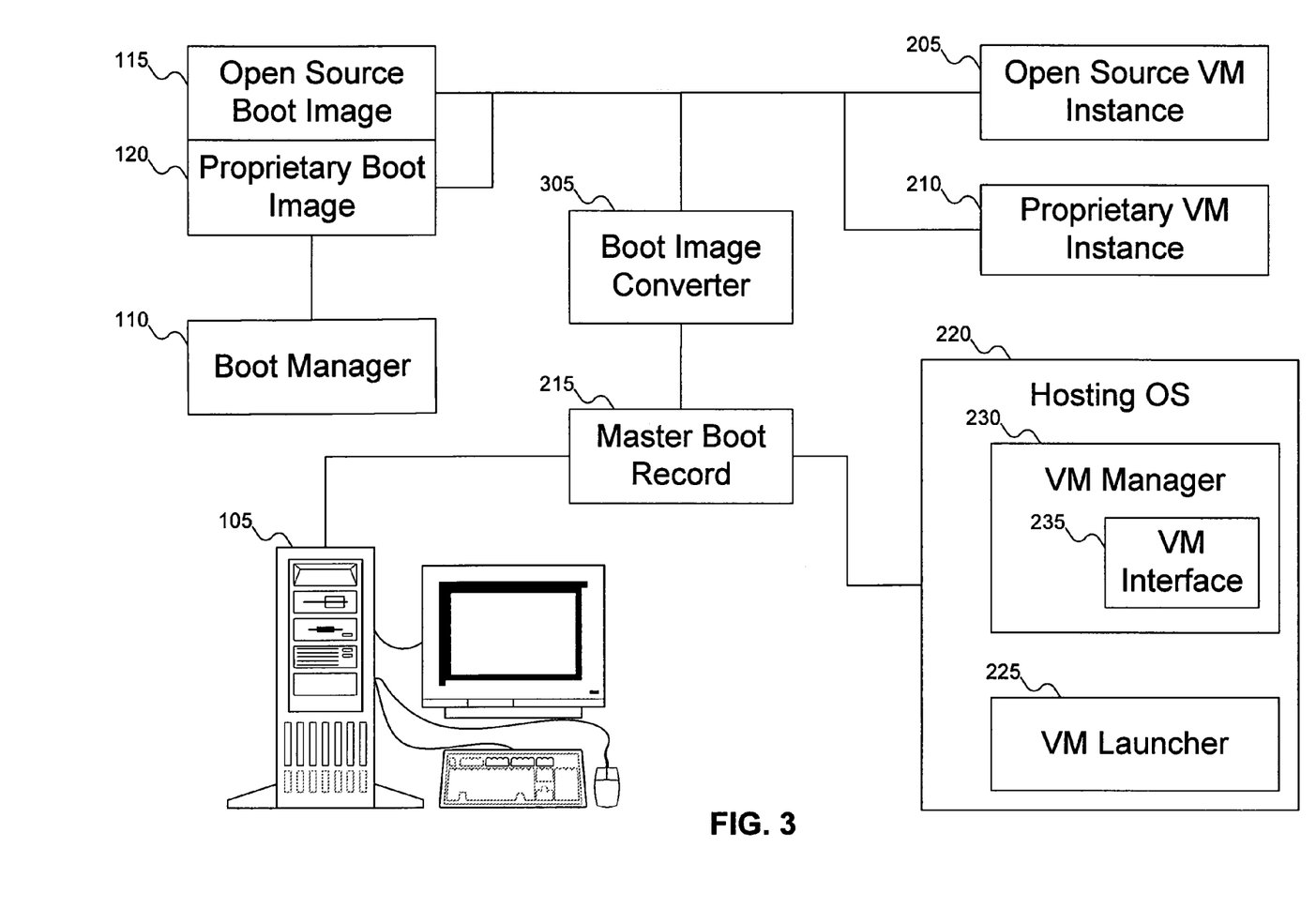
FIG. 3 shows features used to convert the multi-boot computer of FIG. 1 to the virtual machine of FIG. 2.

FIG. 3 shows features used to convert a multi-boot computer to a machine supporting multiple virtual operating systems, according to an embodiment of the invention. Computer 105 includes all the typical elements of a computer, such as a central processor, memory, bus, disk space, etc. In addition, computer 105 can be connected to a network, such as a LAN, WAN, the Internet, etc., via either a wired or a wireless (such as IEEE 802.11a/b/g/n, among others) connection.

As previously discussed with reference to FIG. 1, computer 105 contains boot manager 110 to manage multiple boot images. Computer 105 includes open source boot image 115 and proprietary boot image 120, each representing an operating system that can run on the computer. While this embodiment shows both a proprietary boot image and an open source boot image, as discussed above, there can be any number of different types of boot images.

Recall that open source boot image 115 and proprietary boot image 120 cannot both run at the same time in a multi-boot system. To convert both operating systems to VM instances that are able to run in parallel as virtual operating systems, in one embodiment of the invention, computer 105 includes boot image converter 305. As will be discussed in greater detail below, boot image converter 305 identifies open source boot image 115 and proprietary boot image 120. Boot image converter then converts the boot images to open source VM instance 205 and proprietary VM instance 210. Finally, master boot record 215 is updated to boot new hosting OS 220 that will run on computer 105 upon startup of the computer. Hosting OS 220 includes VM manager 230 and VM launcher 225, and is discussed in greater detail with reference to FIG. 11.

As mentioned above, a dual-boot computer can have two operating systems installed and available by selection in a boot menu. Embodiments of the invention are applicable to converting multi-boot computers where there are more than two boot images. There is no limit to the number of boot images available on a multi-boot computer (other than the practical limit imposed by disk space or limits imposed by the boot loader). As long as a boot image is designed to work on the hardware of computer 105, the boot image can be loaded by the boot manager. The principles involved in both the dual-boot and multi-boot computer systems are the same. Only one boot image can be run at a time, and switching to another boot image requires a reboot of the computer.

The converted system can support any number of VM instances, provided there is adequate hard disk space for the converted VM instances and the hosting OS is able to support each of the converted VM instances. If there is not enough hard disk space or the hosting OS is unable to support all converted VM instances, then in an embodiment of the invention the boot image converter can gracefully exit from the conversion process and allow the user to continue using the computer as a multi-boot computer.

While the above discussion centers on converting multi-boot or dual-boot computers to use VM instances, a person skilled in the art will also recognize that even a single-boot computer can be converted to use VM instances. In this situation, there might not be a boot manager (as the one OS on the computer is often directly booted). But this single OS can be detected and converted. A user might want to convert a single-boot computer to use VM instances, to enable later installation of additional VM instances without having to configure the computer for dual- or multi-boot operation. When a single-boot computer is converted to use VM instances, in an embodiment of the invention, the configuration of OS is detected and the used to create an equivalent configuration for the converted VM instance. However, the conversion of a single boot OS does not give rise to conflicts that are detected and resolved when converting a multi-boot computer as discussed below with reference to FIG. 6 and FIG. 7.

In an embodiment of the invention, if space is needed on the hard drive to make room for new hosting OS 220, boot image converter 305 can reformat or repartition the hard drive, as needed. Also, if additional hard disk space is still needed, additional space can be added, according to an embodiment of the invention. The additional space can then be utilized by embodiments of the invention. For example, extra internal storage or external storage can be used, or network storage could be made available.

If, after attempting to make more space available, there is still insufficient hard disk space, the conversion of boot images to VM instances can be aborted, and the user can be notified of the insufficient disk space. Then the converted can exit from the conversion process without modifying the multi-boot computer.

Each VM instance uses its own file system which corresponds to allocated hard disk space called a partition. Installing new hosting OS 220 requires hard disk space for the hosting OS. Repartitioning the hard disk allows previously allocated disk space to be re-allocated as appropriate. After repartitioning the hard disk, each VM instance can have its own dedicated partition to store the VM instance, as well as applications running on the VM instance and data.

Figure 4:
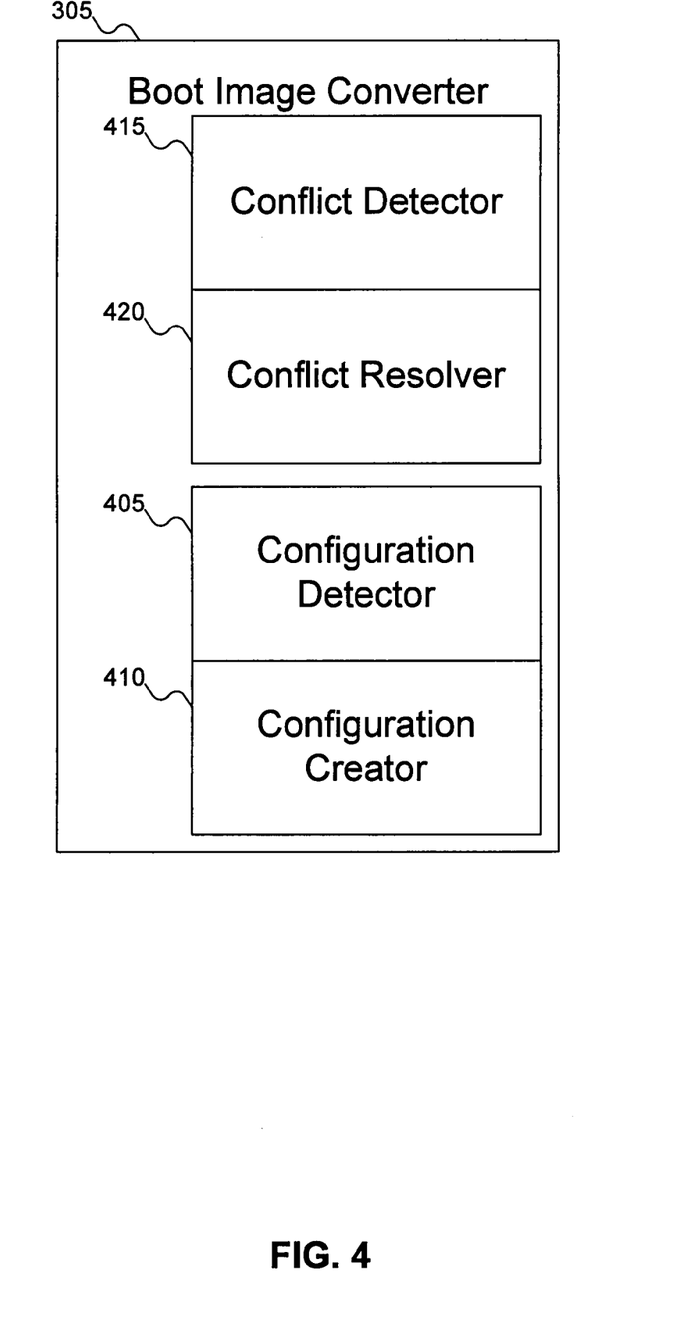
FIG. 4 shows the boot image converter on the computer of FIG. 3 used to convert boot images to the virtual machine instances of FIG. 2.

FIG. 4 shows the boot image converter of FIG. 3, used to convert boot images to virtual machine instances. Once existing boot images on a computer are identified, boot image converter 305 converts the boot images to VM instances. Then boot image converter 305 uses configuration detector 405 and configuration creator 410 to produce a VM instance that operates similarly to the identified boot images. Although FIG. 4 shows configuration detector 405 and configuration creator 410 as separate elements, a person skilled in the art will recognize that configuration detector 405 and configuration creator 410 can be combined into a single component. Configuration detector 405 and configuration creator 410 are discussed in greater detail below with reference to FIG. 5.

After configuration detector 405 and configuration creator 410 have configured VM instances corresponding to all existing boot images, conflict detector 415 checks to see if there are any conflicts that will prevent two or more VM instances from running in parallel. Conflict detector 405 and conflict resolver 420 can identify and resolve different types of conflicts between the VM instances. These types of conflicts are discussed in greater detail below with reference to FIG. 6.

Figure 5:
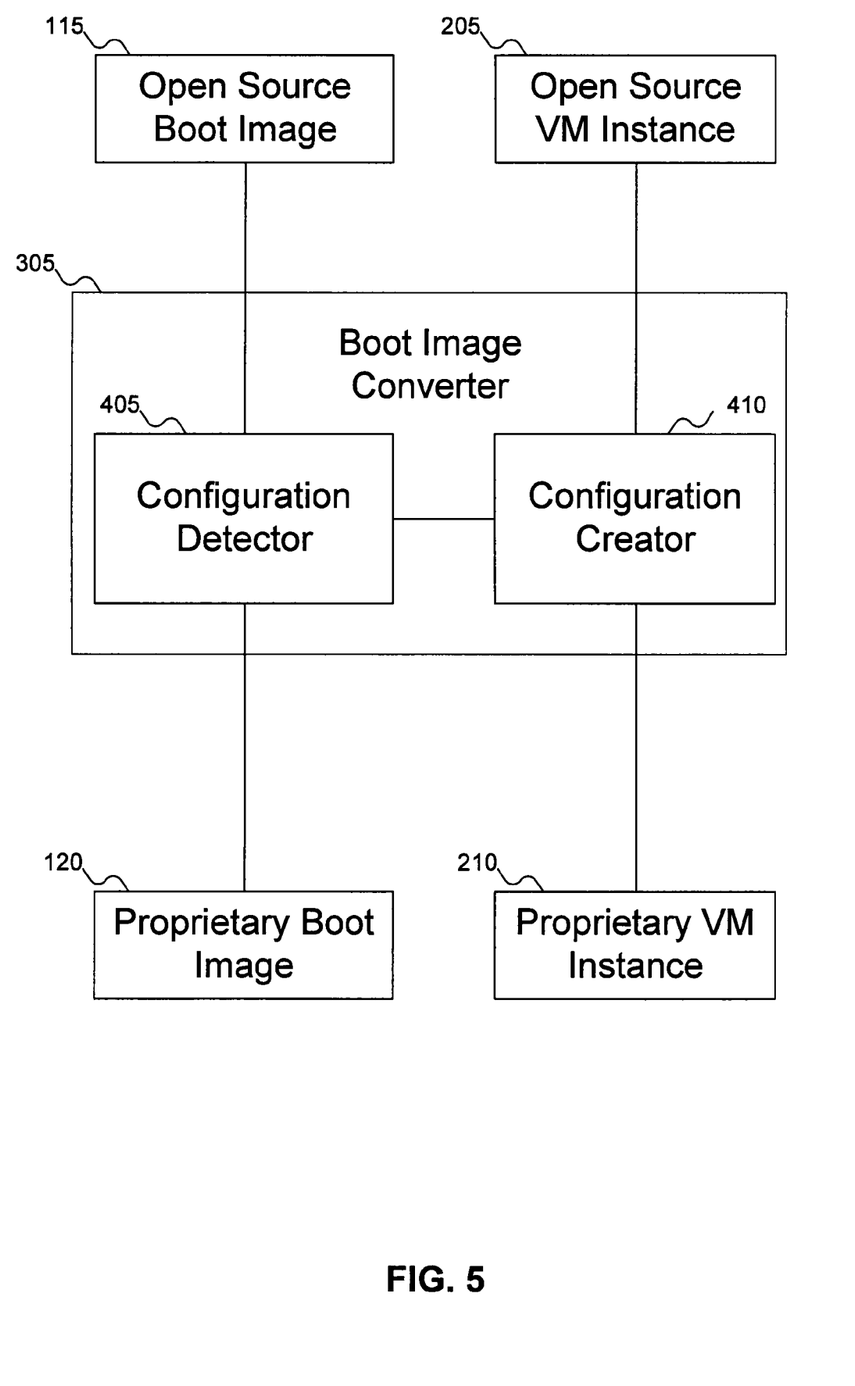
FIG. 5 shows the configuration detector and creator of FIG. 4 to detect configurations of existing boot images and create corresponding configurations in the converted virtual machine instances of FIG. 2.

FIG. 5 shows the operation of the configuration detector and creator of the boot image converter of FIG. 4. In an embodiment of the invention, a multi-boot computer starts with open source boot image 115 and proprietary boot image 120. Configuration detector 405 detects the configuration of open source boot image 115 and proprietary boot image 120. Configuration information can include information on installed applications (including hardware drivers), IP addresses, network protocols, and user preferences on the appearance and behavior of the computer. For computers with additional boot images, configuration detector 405 also detects the configuration of all boot images.

Once configuration detector 405 has detected the configuration of a boot image, such as open source boot image 115, configuration detector 405 passes the configuration information to configuration creator 410. Configuration creator 410 then takes the configuration information and applies it to the VM instance that corresponds to the converted boot image. In FIG. 5, open source VM instance 205 corresponds to open source boot image 115. The result of applying the configuration information to open source VM instance 205 is a VM instance that, when started using a VM manager, operates like open source boot image 115.

As FIG. 5 shows two boot images to be converted into VM instances, both VM instances are configured. Boot image converter 305 converts open source boot image 115 to open source VM instance 205 and proprietary boot image 120 to proprietary VM instance 210. Configuration detector 405 detects the configuration of proprietary boot image 120. This configuration information is sent to configuration creator 410 which then applies the configuration to proprietary VM instance 210.

The configuration of the boot image and VM instance include OS settings that control behavior and resources used by the OS. In an embodiment of the invention, configuration detector 405 knows the format for an existing boot image configuration. Specifically, depending on what OS the boot image represents, there can be a different format for the OS configuration. For example, computers running 32-bit versions of Microsoft Windows use a Windows registry to store configuration information. Boot image creator 410 similarly knows if and how to configure the corresponding VM instance.

Figure 6:
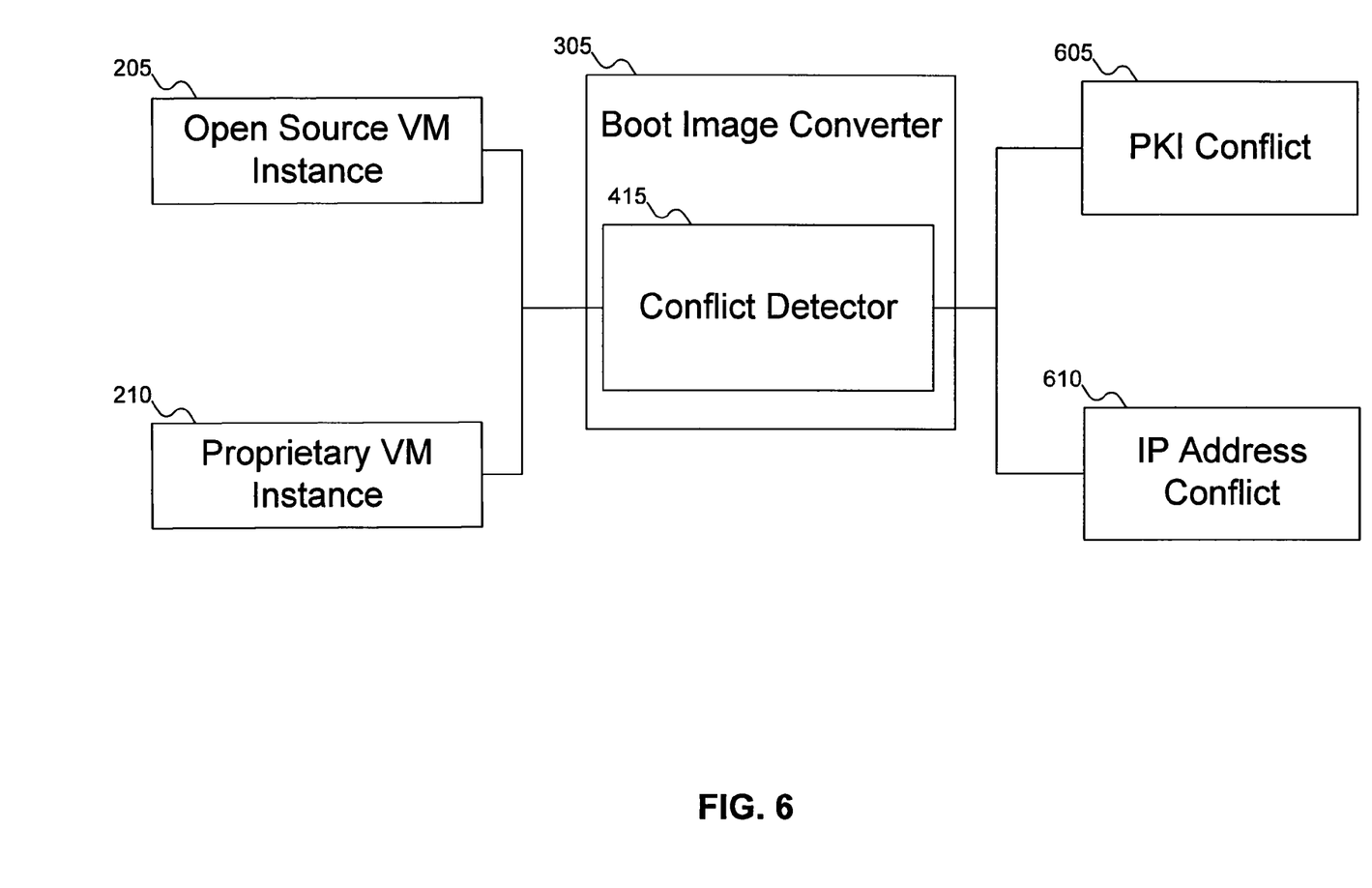
FIG. 6 shows types of conflicts identified by the conflict identifier in FIG. 4 when converting a multi-boot computer to the virtual machine of FIG. 2.

FIG. 6 shows examples of conflicts that can be identified by the conflict detector of FIG. 4. A conflict exists when the operation of one VM instance can interfere with the operation of another VM instance. In the example of FIG. 6, open source VM instance 205 has been converted from an open source boot image, and proprietary VM instance 210 has been converted from a proprietary boot image. Conflict detector 415 examines all VM instances that have been converted from the existing boot images to identify conflicts.

In evaluating the VM instances, conflict detector 415 checks for public key infrastructure (PKI) conflict 605 or internet protocol (IP) address conflict 610, among other possible conflicts. A person skilled in the art will recognize that these types of conflicts are illustrative, and do not represent all types of conflicts that can exist between VM instances.

PKI conflict 605 refers to a public key infrastructure that allows binding of public keys to user identities. Exported certificates store public key information; such as a host name, that enables a user to digitally sign messages using a private key that can be checked using the public key. If the serial boot images have the same host name, then when the boot images are converted to VM instances and run in parallel, there would be a name conflict on the network. Resolution of PKI conflict 605 is discussed below with reference to FIG. 7.

IP address conflict 610 can occur when more than one boot image is configured to use the same static IP address. If boot images are run serially on a computer, multiple boot images can use the same static IP address without conflict because only one OS is running at a given time. But if more than one VM instance uses the same static IP address, then it is not clear to the computer which VM instance is using a networking process (even though it might be readily apparent to a user.) Resolution of IP address 610 is discussed below with reference to FIG. 7.

Figure 7:
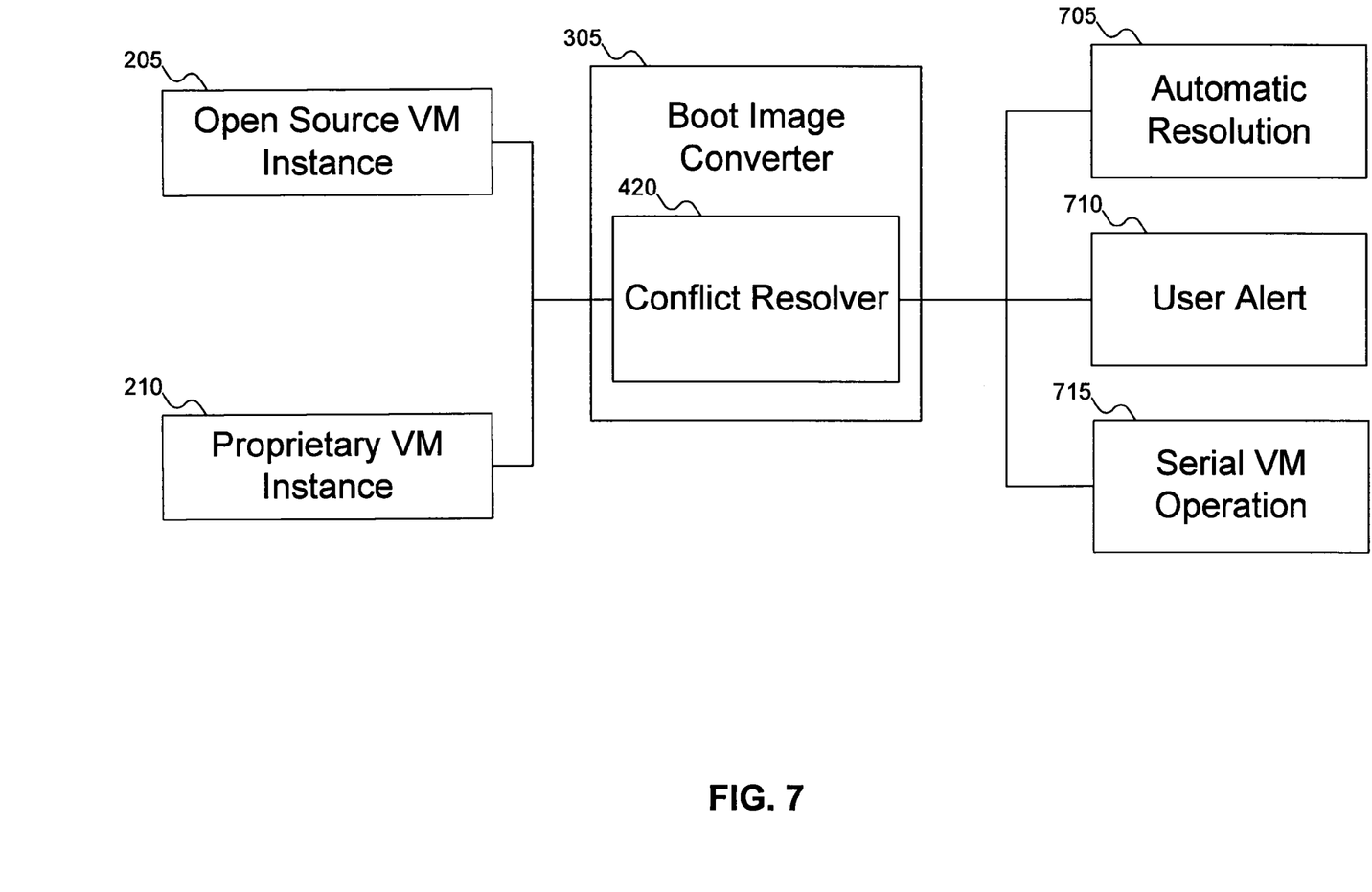
FIG. 7 shows ways of resolving conflicts identified by the conflict identifier in FIG. 4.

FIG. 7 shows ways of resolving conflicts identified by the conflict identifier of FIG. 4. In an embodiment of the invention, some identified conflicts can be resolved automatically, using automatic resolution 705. For example, to resolve multiple VM instances using a single static IP address, open source VM instance 205 and proprietary VM instance 210 can be configured to use Dynamic Host Configuration Protocol (DHCP) instead. The use of DHCP avoids conflicts in IP addressing by dynamically assigning IP addresses to clients requesting a free IP address.

In an embodiment of the invention, automatic resolution 705 might also be an appropriate means to resolve a PKI conflict. If two boot images have the same host name, then the converted VM instances might also be configured to have the same host name, creating a name conflict when the two VM instances are run in parallel. After a PKI conflict is identified, the host name on one of the VM instances can be changed, thereby avoiding the host name conflict.

Another means of resolving identified resource conflicts is by using user alert 710. Sometimes automatic resolution 705 is unable to resolve the conflict. Alerting the user of the conflict and allows the user to resolve the conflict manually. User alert 710 can be used when an optimum resolution is known, but cannot be implemented while the computer is running the VM instances in parallel. For example, if two VM instances are using identical static IP addresses, the administrator of the conversion of the boot images can be alerted to the static IP address conflict and given an opportunity to manually resolve the conflict. If the administrator makes a change to the configuration of one or both of the VM instances (for example, but configuring the VM instances to use DHCP or changing one of the VM instances to use a different static IP address), this change could eliminate the conflict between the IP addresses of the VM instances.

If the conflict cannot be resolved automatically using automatic resolution 705 or manually using user alert 710, it might be necessary to run only one VM instance at a time, by using the serial VM operation 715. Serial VM operation 715 specifies that when one VM instance is loaded by the hosting OS, the other VM instance cannot be run at the same time. In situations where more than two VM instances have been installed, it might be that the conflict exists only between some of the VM instances. In this situation serial VM operation 715 only prevents the conflicting VM instances from running at the same time: non-conflicting VM instances can still be run at the same time.

Figure 8:
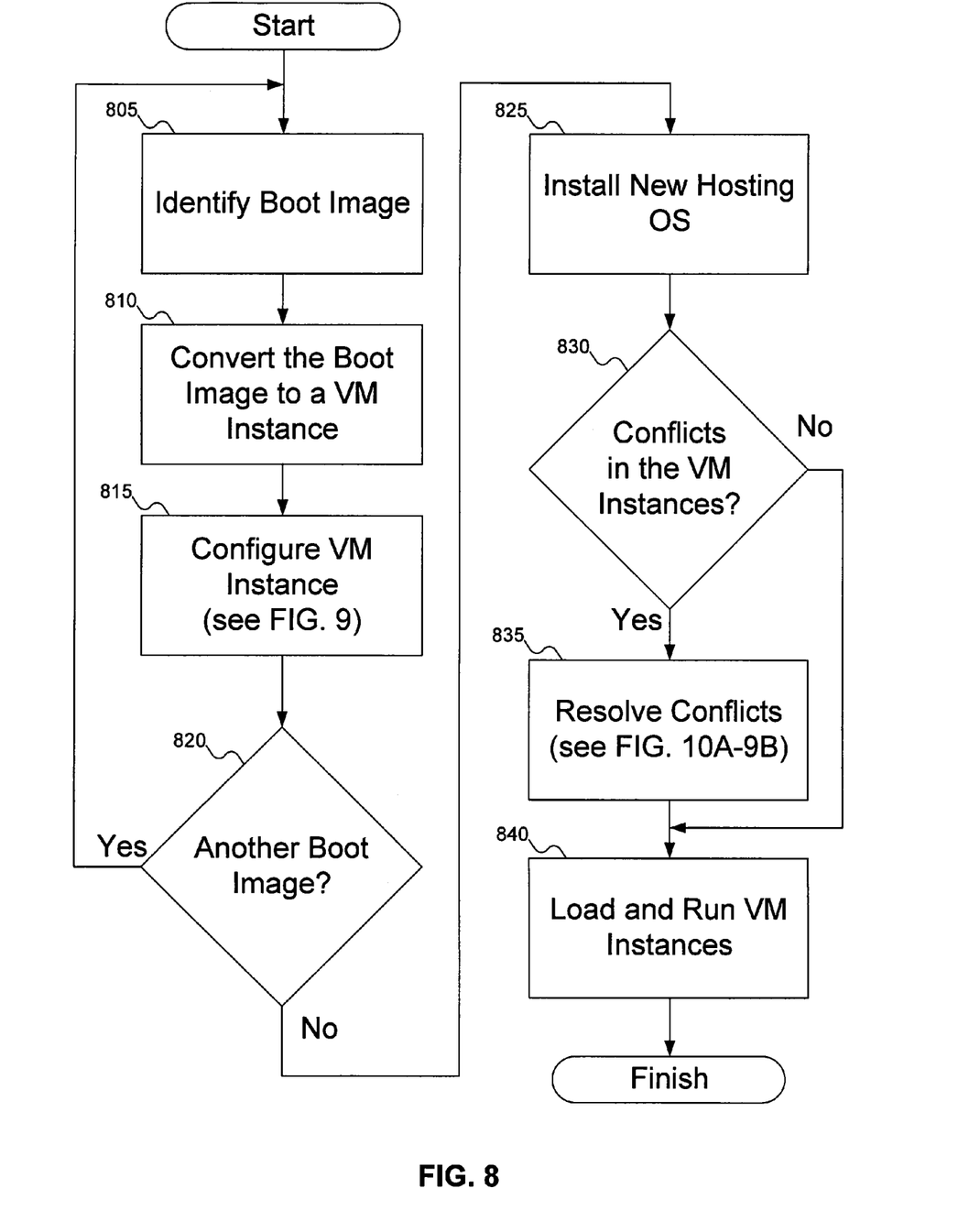
FIG. 8 shows a flowchart of the method for converting a multi-boot computer, as in FIG. 1, to the computer of FIG. 2, using virtual machines, according to an embodiment of the invention.

FIG. 8 shows a flowchart of the method for converting a multi-boot computer to a virtual machine, according to an embodiment of the invention. At step 805, a boot image is identified. In an embodiment of the invention, the boot image can be identified by looking at the boot manager. In another embodiment of the invention, the boot manager is located by looking at the boot menu. In a multi-boot system, the boot menu provides a user with the ability to select which of the available boot images the boot manager should launch. After a boot image is selected, the boot manager can then launch the selected boot image.

After a boot image has been identified, at step 810 the boot image is converted to a VM instance. At step 815 the VM instance is individually configured by examining the configuration of the boot image. After configuration is completed, decision block 820 determines if there is another boot image needing conversion. If there is another boot image to convert, the processing returns to step 805 to identify and convert the next boot image.

Once all boot images have been converted, then at step 825 a new hosting OS is installed. As previously discussed, the new hosting OS is used to launch and manage the converted VM instances. Decision block 830 determines if there are any conflicts in the converted VM instances that prevent running the converted VM instances at the same time. If there are conflicts in the VM instances, then conflicts are resolved at step 835. If there are no conflicts in the VM instance at decision block 830, or after resolving the conflicts, at step 840 the hosting OS can load and run the VM instances.

Figure 9:
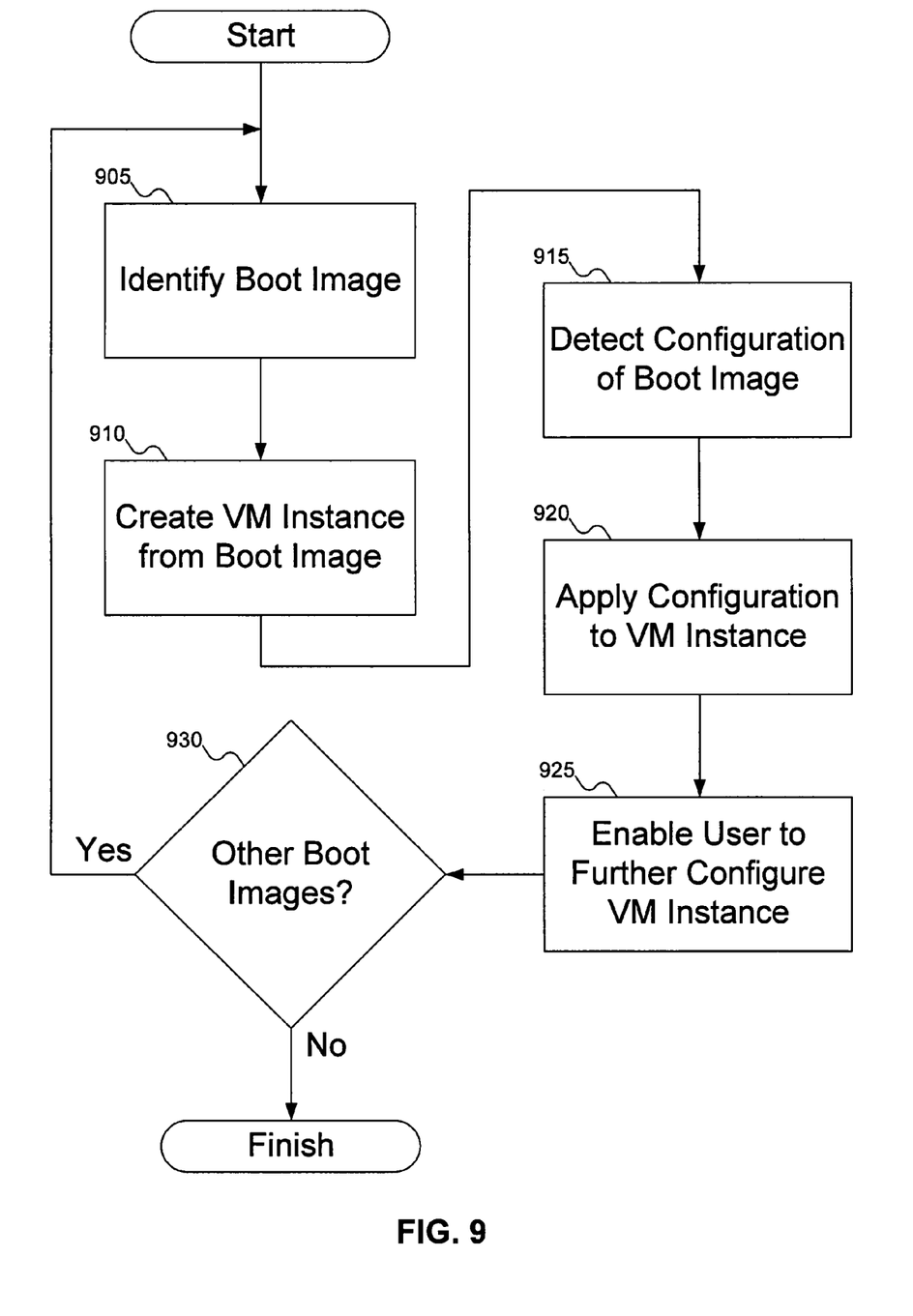
FIG. 9 shows a flowchart of the method for converting a configuration from a boot image to a configuration for a virtual machine instance, according to an embodiment of the invention.

FIG. 9 shows a flowchart of the method for converting a configuration from a boot image to a configuration for a virtual machine instance, according to an embodiment of the invention. At step 905 an existing boot image is identified. As previously discussed, the boot image can be identified by investigating the boot manager or boot menu that allows a user to select the boot image.

After a boot image is identified, at step 910 a VM instance is created based on the OS represented by the boot image. Then at step 915, the configuration of the boot image is detected. Configuration files are identified by looking in known locations for the configurations based on what OS the boot image represents. For example, 32-bit versions of Microsoft Windows store configuration information in the Windows registry. For Linux, configuration information is stored in a directory called "/etc".

Once the configuration of the boot image is detected, at step 920 the configuration is applied to the new VM instance that corresponds to the boot image. Step 925 enables a user or administrator to further configure the VM instance. Finally, at decision block 930, if there are other boot images to convert, processing returns to step 905 where the configuration process continues for the next boot image. If there are no further boot images to convert, then the configuration process is complete.

Figure 10A:
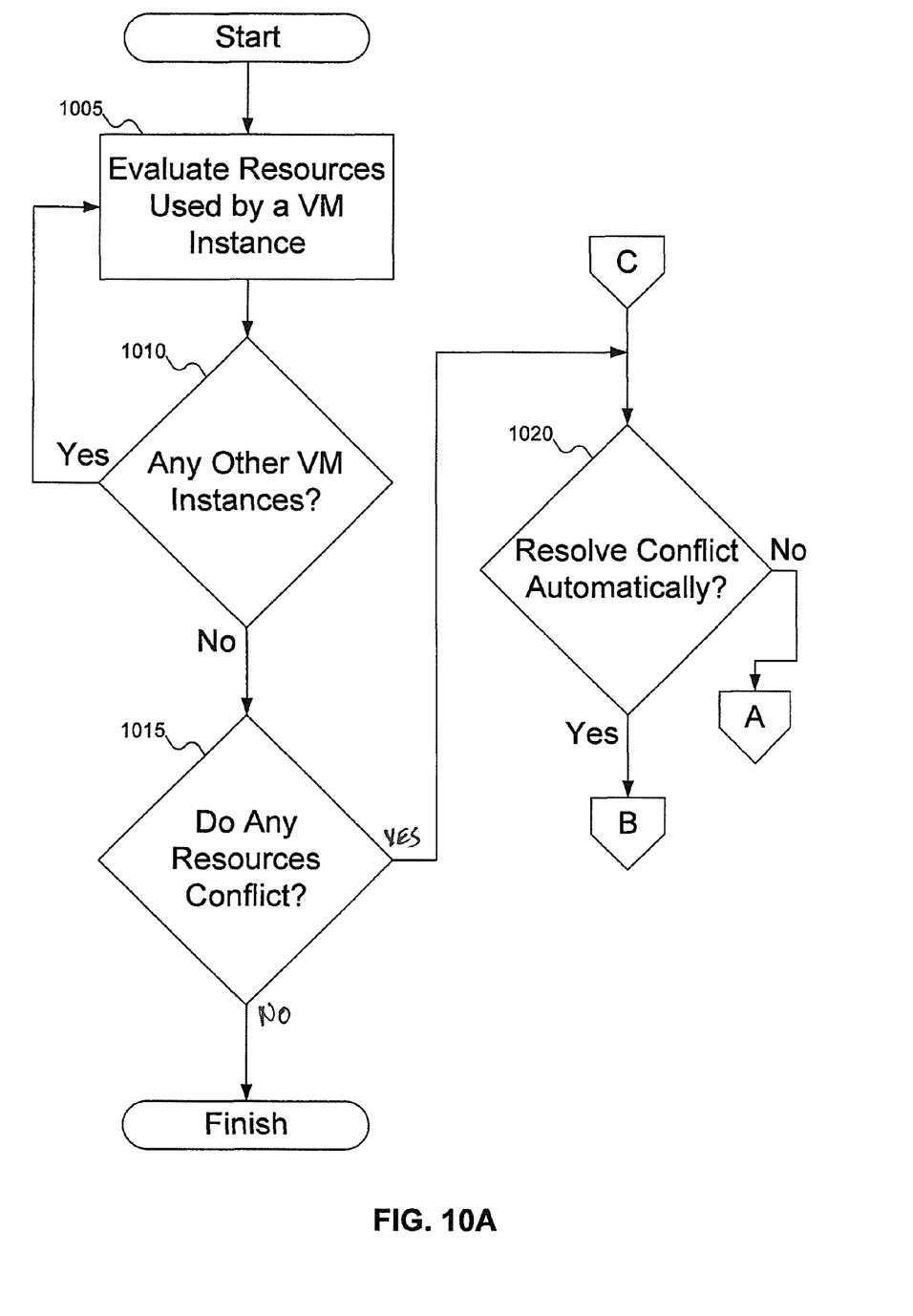
FIGS. 10A-10B show a flowchart of the method for detecting and resolving conflicts in the converted virtual machine instances, according to an embodiment of the invention.
Figure 10B:
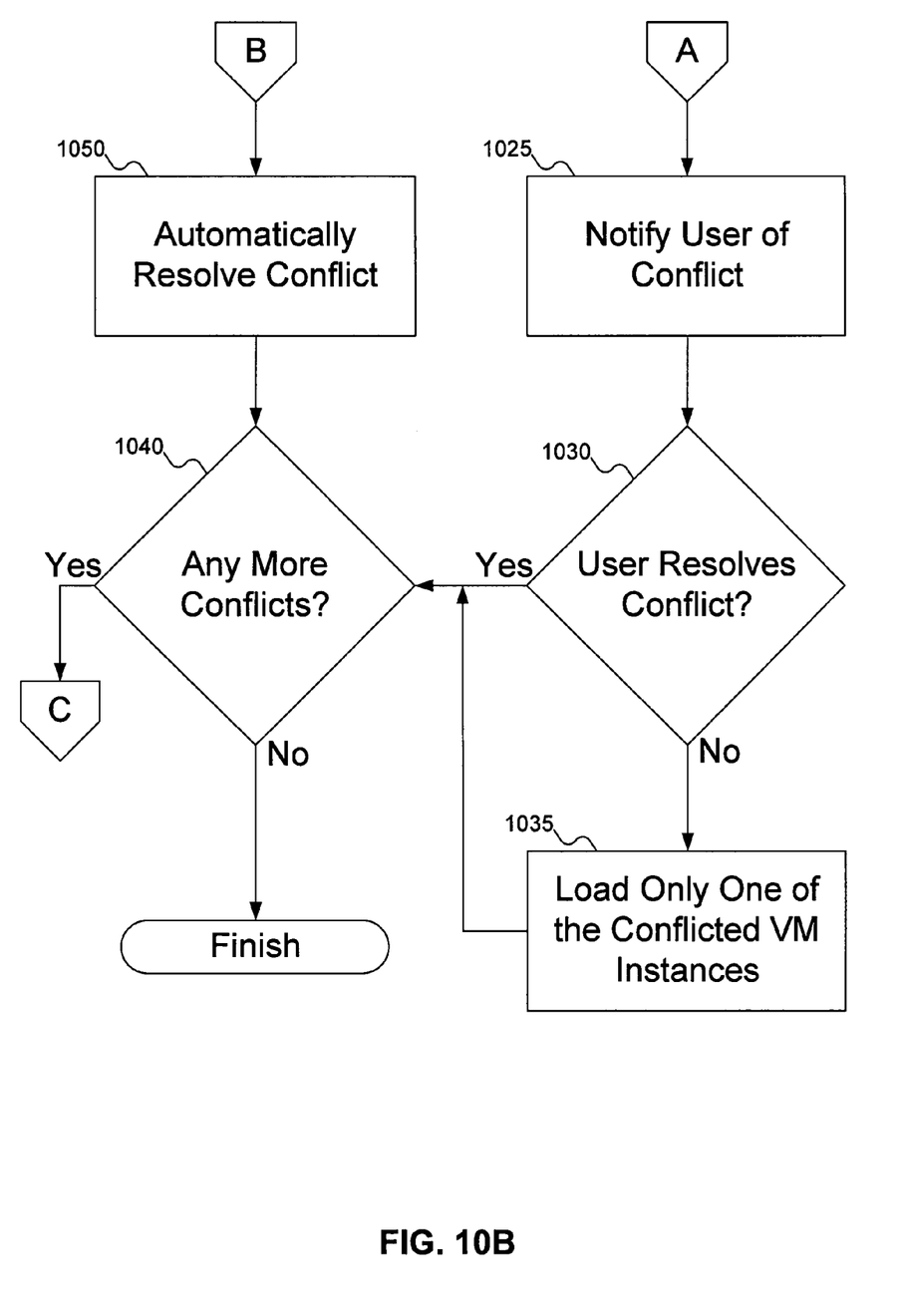

FIGS. 10A-10B show a flowchart of the method for detecting and resolving conflicts in the converted virtual machine instances, according to an embodiment of the invention. At step 1005 the resources used by the VM instance are evaluated. As discussed previously, resources can include information on hardware mappings, networking information such as an IP address, and PKI information, among other possibilities. Decision block 1010 determines whether there are other VM instances to evaluate. If there are other VM instances to evaluate, processing returns to step 1005 to evaluate the resource of the next VM instance.

Once all the resources of all of the VM instances have been identified and evaluated, decision block 1015 determines if any of the VM instances have conflicts. If no conflicts exist, then conversion is completed. But if there are any conflicts, an attempt is made to resolve the conflicts automatically, as represented by decision block 1020. If it is not possible to resolve conflicts automatically, then following off-page reference A to FIG. 10B leads to step 1025, where the user is notified of the conflict. If, at decision block 1030, the user is unable to resolve the conflict, then step 1035 indicates that only one of the conflicted VM instances should be loaded at a time. Regardless of whether the user is able to resolve the conflict or the conflicting VM instance decision block 1040 asks if more conflicts need to be resolved.

At decision block 1040, the system determines if any further conflicts remain. If there are no more conflicts, the conflict resolution process is complete. Otherwise there is another conflict, and using off-page reference C returns processing to decision block 1020, where an attempt is made to resolve the conflict automatically.

This sequence of resolving conflicts is just one possible approach. A person skilled in the art will recognize that the conflict resolver can enable user configuration before automatically resolving the conflict. For example, some users might wish to have as much control over the converted VM instances as possible.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus, comprising:
a computer;
a hard disk on the computer;
a display on the computer;
a boot manager on the computer, the boot manager configured to display a boot menu on the display upon startup of the computer;
a first boot image managed by the boot manager, the first boot image including a first operating system (OS) to run on the computer from a first partition on the hard disk;
a new hosting OS configured to launch and manage a plurality of virtual machine (VM) instances; and
a converter to convert the first boot image to a first VM instance to run under the new hosting OS,
wherein prior to conversion to the first VM instance, the first boot image cannot be used in a virtual machine.

2. An apparatus according to claim 1, further comprising a second boot image managed by the boot manager, the second boot image including a second OS to run on the computer from a second partition on the hard disk, wherein the converter converts the second boot image to a second VM instance to run under the new hosting OS.

3. An apparatus according to claim 2, further comprising:
a conflict detector to detect a conflict between the first VM instance and the second VM instance; and
a conflict resolver to resolve the detected conflict between the first VM instance and the second VM instance.

4. An apparatus according to claim 3, wherein the conflict detector includes a public key interface (PKI) conflict detector to detect a PKI conflict.

5. An apparatus according to claim 3, wherein the conflict detector includes an internet protocol (IP) address conflict detector to detect an IP address conflict.

6. An apparatus according to claim 3, wherein the conflict resolver includes:
a conflict notifier to notify a user of the detected conflict; and a resolution selector to enable the user to select a preferred resolution.

7. An apparatus according to claim 3, wherein the conflict resolver includes running the first VM instance and not the second VM instance.

8. An apparatus according to claim 2, wherein the new hosting OS runs the first VM instance and the second VM instance in parallel.

9. An apparatus according to claim 1, wherein the converter includes:
   a configuration detector to detect a first configuration for the first boot image; and
   a configuration creator to create a second configuration for the first VM corresponding to the first configuration.

10. An apparatus according to claim 9, further comprising a configuration customizer to enable a user to customize the second configuration for the first VM.

11. A method for converting a multi-boot system on a computer into a virtual machine (VM) capable of running more than one operating system (OS) at the same time, the method comprising:
   identifying a first boot image on a first partition of a hard disk on the computer;
   converting the first boot image to a first VM instance;
   identifying a second boot image on a second partition on the computer;
   converting the second boot image to a second VM instance; and
   installing a new hosting OS capable of running the first VM instance and the second VM instance,
   wherein prior to conversion to the first VM instance and the second VM instance, the first boot image and the second boot image cannot be used in a virtual machine.

12. A method according to claim 11, further comprising checking for a conflict between the first VM instance and the second VM instance.

13. A method according to claim 12, wherein checking for a conflict includes checking for a public key infrastructure (PKI) conflict.

14. A method according to claim 12, wherein checking for a conflict includes checking for an internet protocol (IP) address conflict.

15. A method according to claim 12, further comprising resolving the conflict between the first VM instance and the second VM instance.

16. A method according to claim 15, wherein resolving the conflict includes:
   notifying a user of the conflict; and
   receiving from the user a preferred resolution.

17. A method according to claim 15, wherein resolving the conflict includes automatically resolving the conflict between the first VM instance and the second VM instance.

18. A method according to claim 15, wherein resolving the conflict includes running only one of the first VM instance and the second VM instance.

19. A method according to claim 11, further comprising:
   detecting a configuration of the first boot image; and
   configuring the first VM instance.

20. A method according to claim 11, further comprising repartitioning the hard disk.

21. An article, comprising:
   a non-transitory storage medium, the non-transitory storage medium having stored thereon instructions, that, when executed by a machine, result in:
   identifying a boot manager capable of loading more than one operating system (OS);
   identifying a first boot image on a first partition of a hard disk;
   converting the first boot image into a first virtual machine (VM) instance identifying a second boot image on a second partition;
   converting the second boot image to a second VM instance; and
   installing a new hosting OS, the new hosting OS to run the first VM instance and the second VM instance,
   wherein prior to conversion to the first VM instance and the second VM instance, the first boot image and the second boot image cannot be used in a virtual machine.

22. An article according to claim 21, the non-transitory storage medium storing thereon further instructions, that, when executed by the machine, result in:
   checking for a conflict between the first VM instance and the second VM instance; and
   resolving the conflict between the first VM instance and the second VM instance.

23. An article according to claim 22, wherein checking for a conflict includes identifying a conflict that will prevent the first VM instance and the second VM instance from running at the same time.

24. An article according to claim 22, wherein resolving the conflict includes automatically resolving the conflict between the first VM instance and the second VM instance.

25. An article according to claim 22, wherein resolving the conflict includes:
   notifying a user of the conflict; and
   receiving from the user a preferred resolution.

26. An article according to claim 21, wherein the new hosting OS runs the first VM instance and the second VM instance in parallel.

27. An article according to claim 21, the non-transitory storage medium storing thereon further instructions, that, when executed by the machine, result in:
   detecting a configuration of the first boot image; and
   configuring the first VM instance.

28. An article according to claim 21, the non-transitory storage medium storing thereon further instructions, that, when executed by the machine, result in repartitioning the hard disk.

* * * * *